United States Patent
Monzen

(10) Patent No.: US 9,853,710 B2
(45) Date of Patent: Dec. 26, 2017

(54) RELAY APPARATUS SPECIFYING FREQUENCY OFFSET BASED ON CONNECTION HISTORY AND METHOD THEREOF

(71) Applicant: KYOCERA CORPORATION, Kyoto (JP)

(72) Inventor: Maimi Monzen, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/213,686

(22) Filed: Jul. 19, 2016

(65) Prior Publication Data

US 2017/0033860 A1    Feb. 2, 2017

(30) Foreign Application Priority Data

Jul. 27, 2015    (JP) ................. 2015-147833

(51) Int. Cl.
| | | |
|---|---|---|
| *H04B 7/15* | (2006.01) | |
| *H04B 7/155* | (2006.01) | |
| *H04W 72/04* | (2009.01) | |

(52) U.S. Cl.
CPC ..... *H04B 7/15542* (2013.01); *H04B 7/15507* (2013.01); *H04W 72/0453* (2013.01)

(58) Field of Classification Search
CPC ............ H04B 7/15507; H04B 7/15542; H04B 7/15528; H04B 7/1555; H04B 7/15557; H04B 7/15592; H04B 7/204; H04B 7/155; H04B 7/15; H04B 7/14; H04W 84/047; H04W 16/26; H04W 36/08; H04W 84/045; H04W 88/04; H04W 36/14; H04W 36/38; H04W 36/00; H04W 36/0061; H04W 36/34; H04W 40/22; H04W 36/245; H04W 16/32; H04W 28/18; H04W 36/12; H04W 36/18; H04W 48/18; H04W 84/22; H04W 84/18
USPC ...................................... 455/7–25
See application file for complete search history.

(56) References Cited

U.S. PATENT DOCUMENTS

| | | | | |
|---|---|---|---|---|
| 2011/0124330 A1* | 5/2011 | Kojima | ............... | H04W 36/32 455/424 |
| 2013/0172000 A1* | 7/2013 | Van Phan | ............ | H04W 16/26 455/450 |
| 2013/0215821 A1* | 8/2013 | Yamamoto | ........... | H04W 76/02 370/315 |
| 2013/0273837 A1* | 10/2013 | Okuda | ................. | H04B 7/155 455/9 |
| 2016/0142952 A1* | 5/2016 | Nakata | ............. | H04W 36/0061 455/438 |

FOREIGN PATENT DOCUMENTS

JP    2014-216758 A    11/2014

* cited by examiner

*Primary Examiner* — Philip Sobutka
(74) *Attorney, Agent, or Firm* — Studebaker & Brackett PC

(57) ABSTRACT

A relay apparatus of this disclosure includes: a communication unit that communicates with a radio device by radio; a storage unit that stores connection history information on a past radio connection with the radio device; and a controller that specifies a frequency offset, which is used at a time when the radio connection with the radio device is initiated, based on the connection history information.

6 Claims, 3 Drawing Sheets

RELAY APPARATUS SPECIFYING FREQUENCY OFFSET BASED ON CONNECTION HISTORY AND METHOD THEREOF

CROSS-REFERENCE TO RELATED APPLICATION

This application claims priority from Japanese Patent Application No. 2015-147833 filed on Jul. 27, 2015, the entire subject matter of which is incorporated herein by reference.

TECHNICAL FIELD

This disclosure relates to a relay apparatus that relays a radio signal (wireless signal) and a radio relay method.

BACKGROUND

As a fifth generation mobile communication system is introduced in the future, it is expected that a radio device such as an access point, for example, a relay apparatus or a base station is located all over a downtown. The relay apparatus according to the background art is used, for example, as a radio backhaul station, which is located in the area beyond the reach of a cable (the area, where it takes too much cost to lay the cable, such as a deep area in mountains and an arterial road) and is connected to a core network through the radio communication with the base station without being connected to a core network through the cable. A service area can be enlarged by a radio multistage relay through the radio backhaul station.

Recently, the radio backhaul station is scheduled to be used in an urban area and the like as well as the area beyond the reach of the cable, in order to lower the cost of laying the cable (for example, see JP-A-2014-216758). Further, since the radio backhaul station does not require a work to lay the cable for the connection with a network, the access point can be additionally provided with degrees of freedom. Accordingly, it is expected that the radio backhaul type, which can performs a relay between the radio devices by radio, spreads in the future.

SUMMARY

This disclosure is to provide a relay apparatus and a radio relay method which improve the performance of the radio backhaul system when the radio communication with the radio device is initiated.

A relay apparatus of this disclosure includes: a communication unit that communicates with a radio device by radio; a storage unit that stores connection history information on a past radio connection with the radio device; and a controller that specifies a frequency offset, which is used at a time when the radio connection with the radio device is initiated, based on the connection history information.

In the above described relay apparatus, the connection history information may include at least one of a connection time and the number of times of connection, and wherein the controller specifies the frequency offset, based on the at least one of the connection time and the number of times of connection.

In the above described relay apparatus, the controller may specify a radio device that has made at least one of a longest connection time and a largest number of times of connection, and the controller may specify a frequency offset of the specified radio device, as the frequency offset used by the radio device, with which the radio connection is initiated.

In the above described relay apparatus, the controller may specify a radio device that has most recently connected with the relay apparatus, among met radio devices which meets a predetermined criteria, in which a criteria for at least one of the connection time and the number of times of connection is set, and the controller may specify a frequency offset of the specified radio device, as the frequency offset used by the radio device, with which the radio connection is initiated.

In the above described relay apparatus, the controller may specify a radio device that has most frequently communicated from a radio terminal at a time when the radio connection is performed, among met radio devices which meets a predetermined criteria, in which a criteria for at least one of the connection time and the number of times of connection is set, and the controller may specify a frequency offset of the specified radio device, as the frequency offset used by the radio device, with which the radio connection is initiated.

A radio relay method of a relay apparatus including a communication unit communicating with a radio device by radio and a storage unit storing connection history information on a past radio connection with the radio device, the method includes specifying a frequency offset, which is used at a time when the radio connection with the radio device is initiated, based on the connection history information.

According to this disclosure, there is provided the relay apparatus and the radio relay method which improve the performance of the radio backhaul system when the radio communication with the radio device is initiated.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an embodiment of this disclosure will be described with reference to the drawings.

Figure 1:
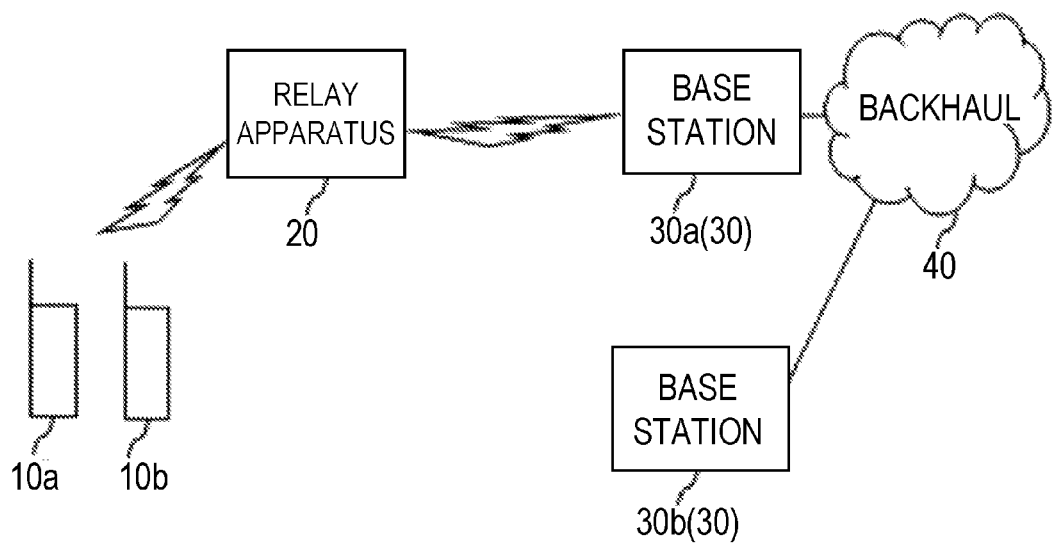
FIG. 1 is a configuration diagram of a radio communication system according to an embodiment of this disclosure.

FIG. 1 is a configuration diagram of a radio communication system according to the embodiment of this disclosure. The radio communication system illustrated in FIG. 1 includes a radio terminal 10a and a radio terminal 10b, a relay apparatus 20 that relays information between the radio terminals 10a, 10b and a base station 30, and the base station 30 (access point: a radio device such as an AP) that transfers the information between the relay apparatus 20 and a backhaul 40.

The relay apparatus 20 can be connected to any one of base stations 30a and 30b by radio.

The indication of the radio terminals 10a and 10b is used in a case where a radio terminal 10 is individually distinguished, and the indication of the radio terminal 10 is used in a case where the radio terminal 10 is not distinguished. The indication of the base stations 30a and 30b is used in a case where the base station 30 is individually distinguished, and the indication of the base station 30 is used in a case where the base station 30 is not distinguished.

The base station 30 can communicate with the radio terminal 10a and the radio terminal 10b, which will not be described in the embodiment of this disclosure since the matter would not have a relation with this disclosure. The backhaul 40 is a network provided by a communication carrier and the like and transferring the information between the terminals.

Figure 2:
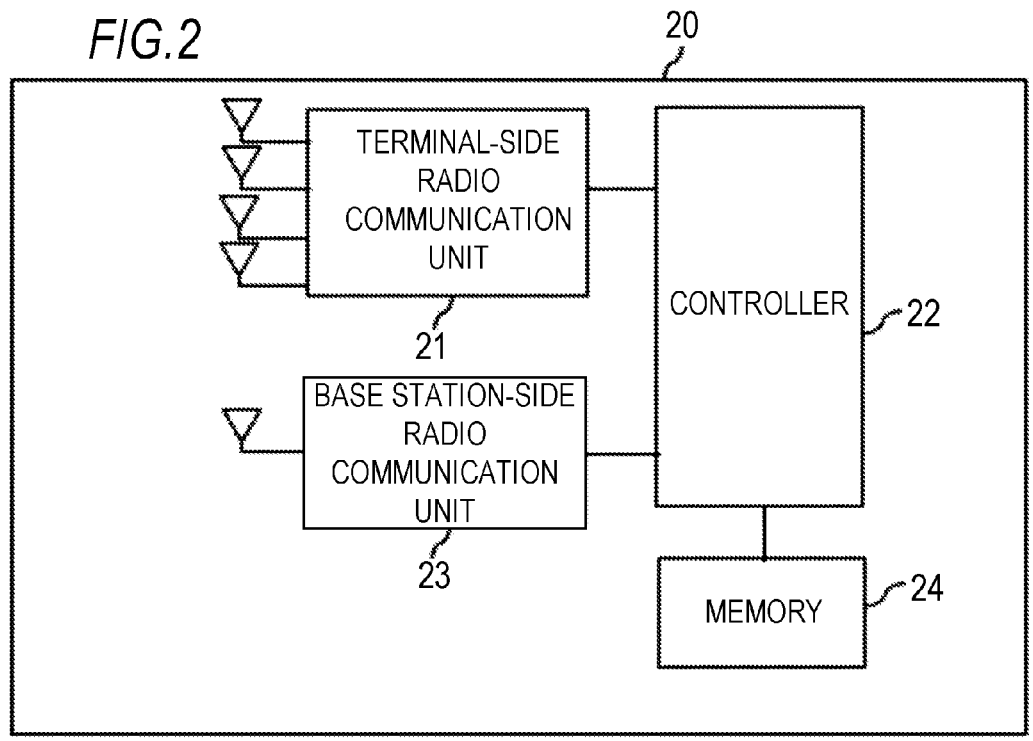
FIG. 2 is a block configuration diagram of a relay apparatus according to the embodiment of this disclosure.

The configuration of the relay apparatus according to the embodiment of this disclosure will be described with reference to FIG. 2.

The relay apparatus 20 includes a terminal-side radio communication unit 21, a controller 22, and a base station-side radio communication unit 23.

The terminal-side radio communication unit 21 is configured to communicate with the radio terminal 10 by radio. The terminal-side radio communication unit 21 is configured to output the information transmitted from the radio terminal 10 to the controller 22, and transmit the information output from the controller 22 to the radio terminal 10.

The terminal-side radio communication unit 21 may include a plurality of adaptive array antennas and be configured to perform beam-forming.

The controller 22 is configured to control the terminal-side radio communication unit 21 and the base station-side radio communication unit 23, output the information output from the terminal-side radio communication unit 21 to the base station-side radio communication unit 23, and output the information output from the base station-side radio communication unit 23 to the terminal-side radio communication unit 21.

When the radio connection with the base station 30 (access point: AP) is initiated, the controller 22 specifies the frequency offset used by the base station 30, where the radio connection is initiated, by using the connection history information on the past radio connection with the base station 30.

The process executed by the controller 22 will be described below as an operation of the relay apparatus 20.

The base station-side radio communication unit 23 is configured to communicate with the radio terminal 10 by radio. The terminal-side radio communication unit 21 is configured to output the information transmitted from the backhaul 40 to the controller 22 and transmit the information output from the controller 22 to the backhaul 40.

The base station-side radio communication unit 23 has one antenna in the drawing, but may include a plurality of adaptive array antennas and be configured to perform the beam-forming.

A memory 24 stores the information necessary to control the relay apparatus. Particularly, the memory 24 in this embodiment stores the connection history information on the radio connection with the base station 30.

The connection history information includes the connection time or the number of times of the past radio connection with the base station 30 and frequency offsets of each of the base stations 30.

A flowchart illustrating a flow of an operation of a relay apparatus according to a first embodiment of this disclosure will be described with reference to FIG. 3.

Figure 3:
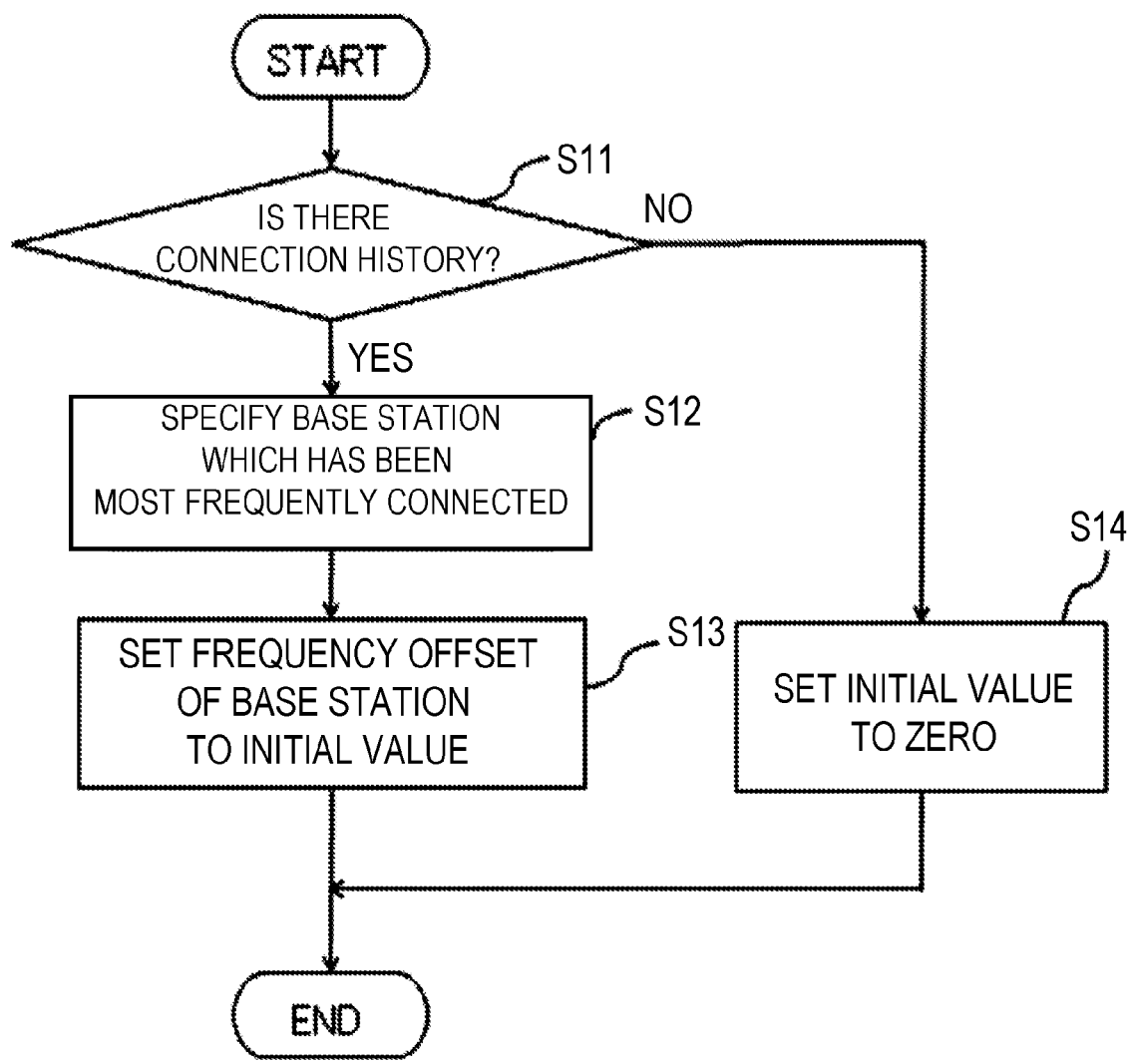
FIG. 3 is a flowchart illustrating a flow of an operation of a relay apparatus according to a first embodiment of this disclosure.

The flowchart of FIG. 3 illustrates an example in which the relay apparatus 20 starts reconnection with the base station 30 due to some reasons.

First, in Step S11, the controller 22 checks whether there is the connection history information in the memory 24. In a case where there is no connection history information, the initial value of the frequency offset for the connection with the base station 30 is set to zero (Step S14).

Next, in Step S12, in a case where there is the connection history information, the controller 22 collects the number (or the cumulative number) of times of the connection with each of the base station 30 from the connection history information, and specifies the base station 30 having the largest number of times of connection among the collected numbers. Further, the controller 22 collects the time or the cumulative time) of the connection with each of the base station 30 from the connection history information, and specifies the base station 30 having the longest collected connection time.

Next, in Step S13, the controller 22 sets the frequency offset used by the specified base station 30 as an initial value. Then, the base station-side radio communication unit 23 starts the radio connection with the base station 30 at the initial value.

As described above, the relay apparatus according to the first embodiment of this disclosure specifies the frequency offset of the base station 30 having the longest connection time or the largest number of times of connection as the frequency offset used by the base station 30 where the radio connection is initiated. Therefore, it is possible to connect the base station which is considered to have been connected immediately before the connection.

The relay apparatus according to the first embodiment of this disclosure can improve the performance of a radio backhaul system at the time of starting the radio communication with the base station 30.

When it is fail to start the radio connection with the base station 30 at the initial value specified by the controller 22, the radio connection with the base station 30 is continuously initiated using another frequency offset.

Figure 4:
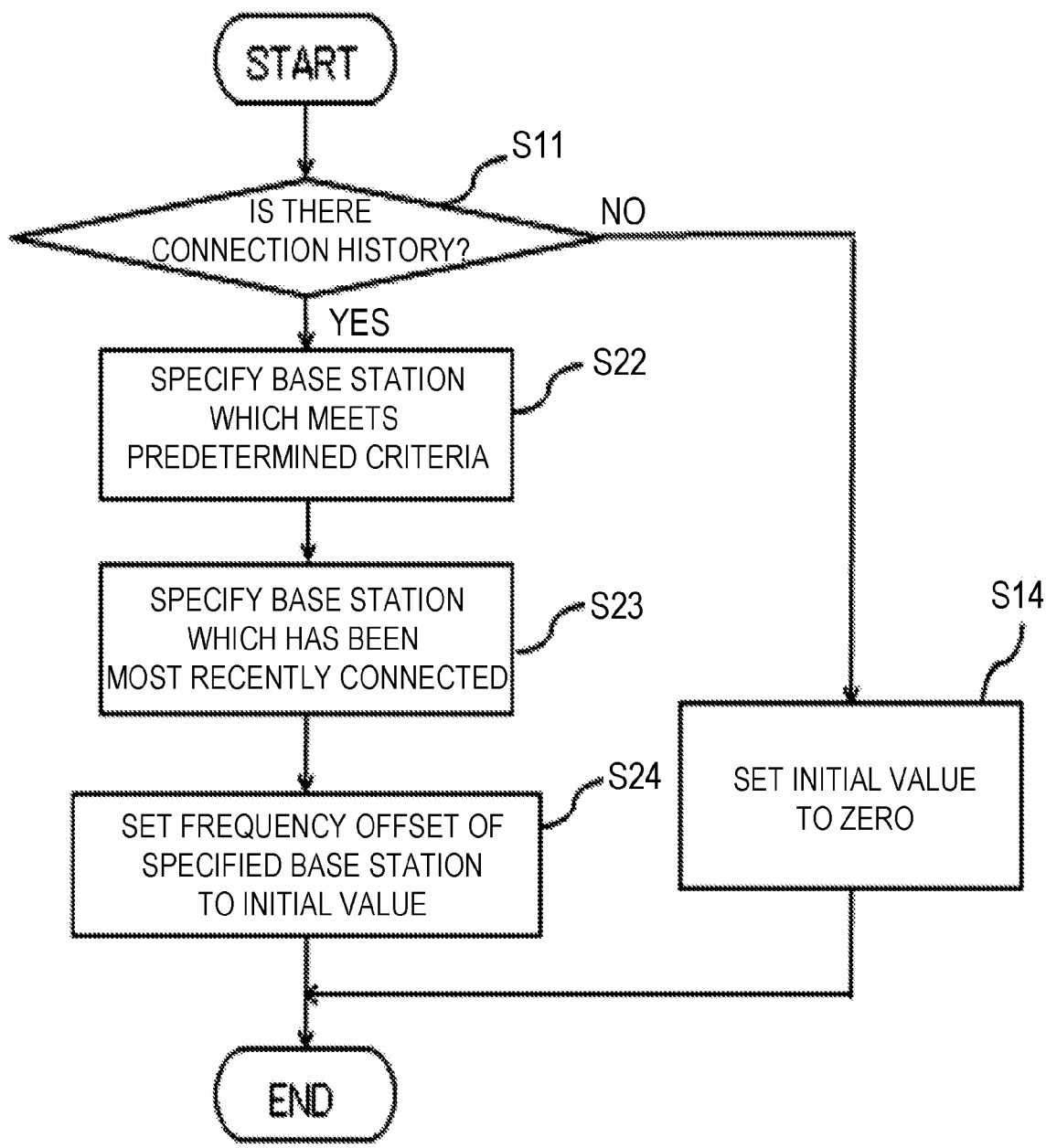
FIG. 4 is a flowchart illustrating a flow of an operation of a relay apparatus according to a second embodiment of this disclosure.

A flowchart illustrating a flow of an operation of a relay apparatus according to a second embodiment of this disclosure will be described with reference to FIG. 4.

First, in Step S11, the controller 22 checks whether there is the connection history information in the memory 24. In a case where there is not the connection history information, the initial value of the frequency offset for the connection with the base station 30 is set to zero (Step S14).

Next, in Step S22, in a case where there is the connection history information, the controller 22 specifies the base station 30 which meets a predetermined criterion with reference to the connection history information. Herein, the base station 30 that meets the predetermined criterion indicates, for example, the base station 30 where the number of times of connection is a predetermined value or more, and the base station 30 where the connection time is a predetermined value or more.

Next, the controller 22 specifies the base station 30, which has been most recently connected, among the base stations 30 specified in Step S22 (Step S23). Further, in a case where there is not the base station 30 which meets the predetermined criterion, the base station 30 which has been most recently connected is specified, among all base stations 30.

The controller 22 may specify the base station 30, which is most frequently communicated from the radio terminal 10 at the time of the radio connection, among the base station 30 having some kind of factors such as the above-described connection time or the above-described number of times of connection which meets the predetermined criterion. Specifically, the frequency of the communication from the radio terminal 10 indicates the sum of the time when the radio terminal 10 communicates with another communication device through the relay apparatus 20 and the base station 30, or the sum of the number of times of the connection with the opposite communication device. The base station 30 specified in this manner has a strong possibility to have been most recently connected with the relay apparatus 20.

Next, in Step S24, the controller 22 sets the frequency offset used by the specified base station 30 as an initial value. Then, the base station-side radio communication unit 23 starts the radio connection with the base station 30 at the initial value.

As described above, the relay apparatus according to the second embodiment of this disclosure specifies the frequency offset of the base station 30, which has been most recently connected, among the base station 30 having the connection time or the number of times of connection which meets the predetermined criterion, as the frequency offset used by the base station 30 where the radio connection is initiated. Therefore, it is possible to exclude the base station which is considered to be temporally connected immediately before the connection and to connect with the base station which is considered to be optimally connected.

The relay apparatus according to the second embodiment of this disclosure can improve the performance of the radio backhaul system at the time of starting the radio communication with the base station 30.

What is claimed is:

1. A relay apparatus comprising:
    a communication unit that communicates with a radio device by radio;
    a storage unit that stores connection history information on a past radio connection with the radio device; and
    a controller that specifies a frequency offset, which is used at a time when the radio connection with the radio device is initiated, based on the connection history information,
    wherein the connection history information includes at least one of a connection time and the number of times of connection, and
    wherein the controller specifies the frequency offset, based on the at least one of the connection time and the number of times of connection.

2. The relay apparatus according to claim 1,
    wherein the controller specifies a radio device that has made at least one of a longest connection time and a largest number of times of connection, and
    wherein the controller specifies a frequency offset of the specified radio device, as the frequency offset used by the radio device, with which the radio connection is initiated.

3. The relay apparatus according to claim 1,
    wherein the controller specifies a radio device that has most recently connected with the relay apparatus, among met radio devices which meets a predetermined criteria, in which a criteria for at least one of the connection time and the number of times of connection is set, and
    wherein the controller specifies a frequency offset of the specified radio device, as the frequency offset used by the radio device, with which the radio connection is initiated.

4. The relay apparatus according to claim 1,
    wherein the controller specifies a radio device that has most frequently communicated from a radio terminal at a time when the radio connection is performed, among met radio devices which meets a predetermined criteria, in which a criteria for at least one of the connection time and the number of times of connection is set, and
    wherein the controller specifies a frequency offset of the specified radio device, as the frequency offset used by the radio device, with which the radio connection is initiated.

5. A radio relay method of a relay apparatus including a communication unit communicating with a radio device by radio and a storage unit storing connection history information on a past radio connection with the radio device, the method comprising:
    specifying a frequency offset, which is used at a time when the radio connection with the radio device is initiated, based on the connection history information,
    wherein the connection history information includes at least one of a connection time and the number of times of connection, and
    wherein the specifying comprises specifying the frequency offset based on the at least one of the connection time and the number of times of connection.

6. A relay apparatus including a communication unit that communicates with a radio device by radio, comprising:
    a storage unit that stores instructions; and
    a controller;
    wherein the storage unit stores connection history information on a past radio connection with the radio device; and
    wherein the controller, by executing the instructions, specifies a frequency offset, which is used at a time when the radio connection with the radio device is initiated, based on the connection history information,
    wherein the connection history information includes at least one of a connection time and the number of times of connection, and
    wherein the controller specifies the frequency offset, based on the at least one of the connection time and the number of times of connection.

* * * * *